3,169,332
STRIP STORAGE DEVICE
Norman J. Rosenburgh, Rochester, N.Y., assignor to Eastman Kodak Company, Rochester, N.Y., a corporation of New Jersey
Filed July 30, 1962, Ser. No. 213,506
5 Claims. (Cl. 40—106.1)

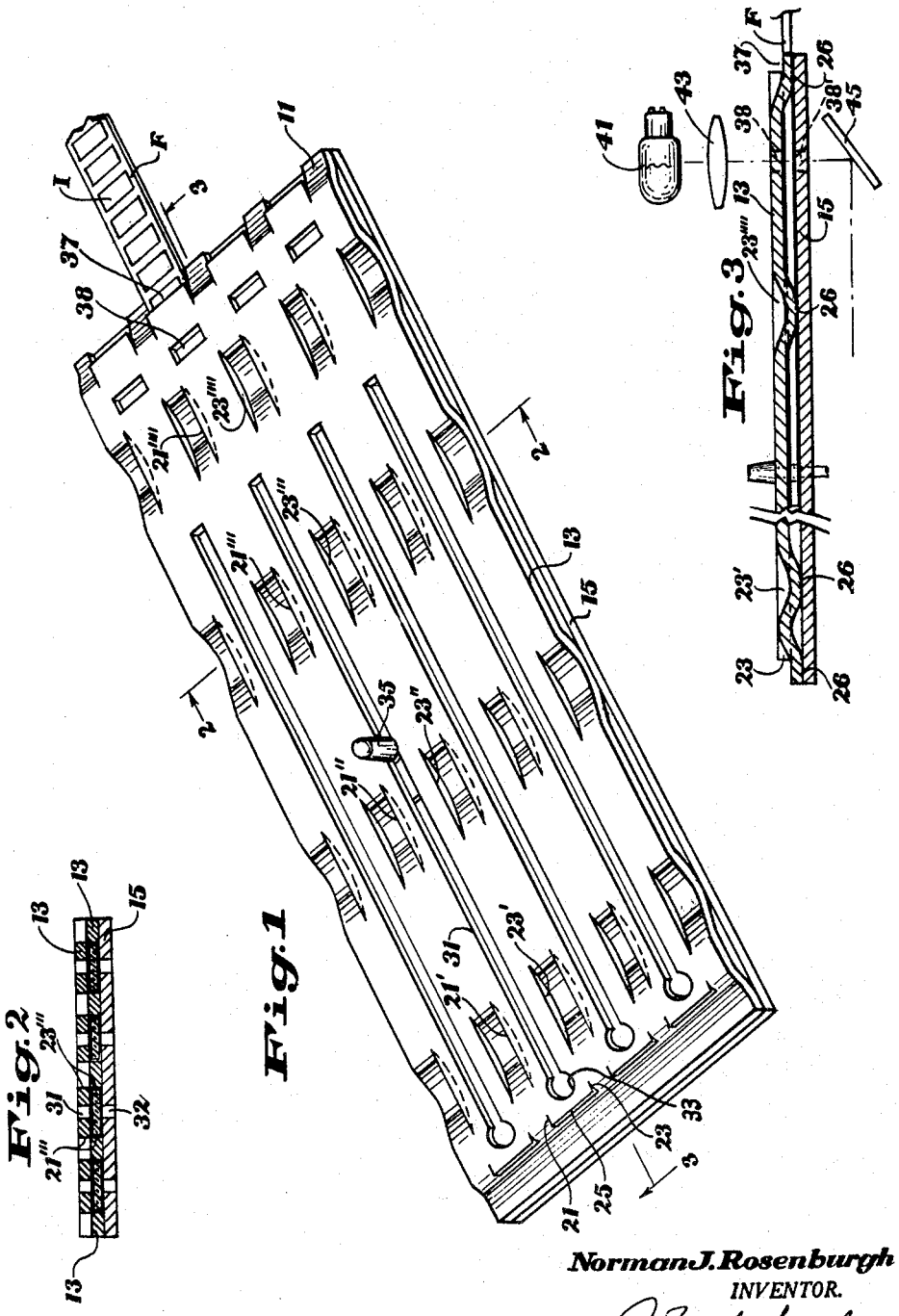

The present invention relates to a two-ply strip storage device for slideably receiving and storing one or more lengths of strip material and to a method of making the same.

The strip storage device of the present invention is particularly useful for receiving and storing strips of film, e.g., microfilm. While the strip storage device of the present invention has been illustrated in the drawings and will be described herein in conjunction with the storage of film strips, it is to be understood that the device can be used with equal facility to receive and store any strip material which one desires to render conveniently available for use in relatively short strip form. In recent years, what with the increased use of photographic film as a storage media for information, there has been considerable interest in the development of new devices and methods of handling film so as to expedite information retrieval. The strip storage device of the present invention is inexpensive to manufacture compared to the devices previously available for storing and handling relatively short lengths of film, and broadly, comprises two superimposed plies, one of which is formed with portions which space the two plies and at the same time serve as edge guides for the strips to be received between the plies.

The primary object of the present invention is, therefore, to provide an improved strip storage device which is relatively inexpensive to manufacture and trouble free in use.

Another object of the present invention is to provide a novel method of making a strip storage device.

Another object of the present invention is to provide a device for receiving and storing strips, which is formed of not more than two superimposed plies.

Yet another object of the present invention is to provide a strip storage device having individual strip receiving channels and constructed to facilitate the longitudinal positioning of strips in and relative to their respective channels.

Still another object of the present invention is to provide a film strip storage device having one or more strip receiving channels, having a viewing aperture in each channel, and constructed to facilitate longitudinal positioning of any film strip in its channel relative to the respective viewing aperture so that any selected image on the strip may be viewed without removing the film strip from the storage device.

Still other objects and advantages of the present invention will become readily apparent to those skilled in the art from the following description with reference to the drawings in which like characters denote like parts and wherein:

FIG. 1 is a perspective view showing the strip storage device of the present invention;

FIG. 2 is a cross-section view of the strip storage device taken along lines 2—2 of FIG. 1; and FIG. 3 is a cross-sectional view taken along lines 3—3 of FIG. 1 and includes a schematic illustration of a viewing apparatus with which the strip storage device may be used.

In FIG. 1 the strip storage device of the present invention is designated generally by the numeral 11. The device 11 comprises an upper ply 13 and a lower ply 15.

The plies are preferably formed of fiberboard but other available materials such as, for example, paper, cardboard, plastic sheeting, and/or thin gauge metal sheets, could be utilized. The strip storage device shown in FIGS. 1 and 2 has four strip receiving channels but it will be appreciated by those skilled in the art that it would be possible, if desired, to make a strip storage device having one, two, three, or more channels utilizing the novel concept of the present invention. Since each channel is identically formed only one will be described in detail herein. For each strip receiving channel two parallel series of slits are provided in ply 13 and are designated in the drawing by the numerals 21, 21', 21'', etc., and 23, 23', 23'', etc., respectively. Each pair of opposed slits, that is, 21 and 23, or 21' and 23', etc., are spaced a distance which is slightly greater than the width of the strip which is to be received by the channel. Another slit 25 extends transversely of slits 21, 23 and the edge formed by slit 25 defines the end of the channel in the storage device. The portions of the ply 13 adjacent to the slits and between the strip receiving channels defined by these slits are deformed downwardly out of the plane of the ply as is best illustrated in FIG. 3. The extent of the deformation is at least equal to the thickness of the strips which are to be stored in the strip receiving channels. Ply 15 is secured to the underside of the deformed portions of ply 13, e.g., at 26 as shown in FIG. 3, by an adhesive or other suitable means to thus form a unitary structure comprising two plies.

In order to facilitate the handling of the strips after they have been positioned in the channels, a pair of opposed slots 31 and 32 are formed in the plies 13 and 15, respectively, medially of the strip receiving channels and extending longitudinally thereof. A slightly enlarged opening 33 is provided in plies 13 and 15 at the end of the slots 31 and 32 near the slit 25. The strips which are to be positioned within the strip receiving channels are formed with a similar opening on the inner end thereof so that the strip when in the channel may be engaged by a pin 35 and, upon moving the pin with respect to the device 11, the strip is moved to any desired position within the channel. Pin 35 can be a permanent part of a viewing apparatus and in such a case it would not remain engaged with the envelope when the envelope is removed from the viewing apparatus. Nevertheless, pin 35 could be fixed on the strip, if desired, or merely manually engaged with the strip to facilitate manipulation of the same.

Each strip receiving channel includes a throat 37 which is formed by the removal of a small section of the ply 13 at the open end of the channel. The throat 37 is slightly wider than the strip to be received by the channel and thus facilitates the initial positioning of the strip therein by guiding the edges and end of the strip.

Near the throat 37 a pair of aligned viewing apertures 38 and 38' are formed in the plies 13 and 15, respectively. The viewing apertures are medially disposed with respect to the strip receiving channels and have a size and configuration which conforms approximately to that of the images which are carried on the strip. Thus assuming the strip is a film F bearing a plurality of recorded images I thereon, it is a simple matter, upon engaging the opening in the end of the film F with pin 35, to position any one of the images carried on the film in the viewing aperture 38. Of course, upon returning the pin to the enlarged opening 33, the film F is relocated within the film receiving channel in the storage device. Because of the configuration of the pin 35 and the slots 31 and 32, it is necessary to fully return the film F to the innermost end of the channel in engagement with the edge of slit 25 before the pin 35 can be disengaged from the film and slots.

FIG. 3 includes a schematic illustration of a projection lamp 41, condenser lens 43, and reflector 45, which are optically aligned with the viewing apertures 38 and 38', respectively, in such a way that the images carried on the film F are transilluminated for viewing. Many different apparatus can be utilized for viewing the film images and since this feature is not a part of the present invention, such apparatus will not be described in detail herein.

An index comprising combinations of characters, letters, or other symbols can be applied to the top surface of the upper ply 13 preferably adjacent to the slot 31 in such a way that the position of each index mark corresponds to the image I on the strip F which is disposed in the viewing aperture when pin 35 is located adjacent to such mark. A further index can be placed on ply 13 to differentiate a given storage device from other similar devices.

It will now be appreciated by those skilled in the art that the strip storage device of the present invention comprises a novel structure formed of two plies of material to minimize its cost of manufacture and which retains strip material conveniently available for use or viewing, as desired. The invention has been described in detail with particular reference to preferred embodiments thereof, but it will be understood that variations and modifications can be effected within the spirit and scope of the invention as described hereinabove and as defined in the appended claims.

Having now particularly described my invention, what I desire to secure by Letters Patent of the United States and what I claim is:

1. A device for storing strips, having a strip storage channel and comprising:
   (a) a first sheet, having
      (1) a channel area, and
      (2) guide areas located on opposite sides of and adjacent to said channel area forming the lateral edges of the strip receiving channel, said guide areas being defined by a plurality of slits arranged parallel to the channel area, and the areas adjacent to said slits and outside of said channel area (i) protruding from said first sheet and (ii) having portions which lie in a plane spaced from and parallel to said first sheet;
   (b) a second sheet,
      (1) substantially co-extensive with the channel area and the guide areas, and
      (2) secured to said portions of the guide areas to form with said channel area and said portions the strip receiving channel.

2. A two-ply storage device having a strip-receiving channel, said device comprising:
   (a) a first ply having at least two parallel series of slits which define a channel area;
   (b) the slits of each series being longitudinally aligned and the two series being spaced apart a distance greater than the transverse width of a strip to be received in said channel;
   (c) portions of the first ply adjacent to the slits and outside of said channel area projecting from the plane of said first ply a distance at least equal to the thickness of said strip; and
   (d) a second ply superimposed on said first ply and secured to said portions, whereby the strip-receiving channel is formed between the projecting portions and the two plies.

3. A device in accordance with claim 2 wherein said first and second plies have slots located in opposed relation medially of said channel and extending longitudinally thereof, to facilitate engagement of a strip when in said channel and longitudinal movement thereof within the channel.

4. A two-ply device having a strip-receiving channel for storing a filmstrip, comprising:
   (a) a first ply having
      (1) a first series of longitudinally aligned slits,
      (2) a second series of slits which are parallel to said first series and spaced therefrom a distance greater than the transverse width of the filmstrip to be stored and defining a channel area therebetween, and
      (3) a single slit extending transversely of said first and said second series of slits, and formed in said first ply adjacent to one end thereof to define one end of said channel area;
   (b) portions of said first ply adjacent to said single slit and said first and said second series of slits and outside of the channel area extending from the plane of said first ply a distance at least equal to the thickness of the filmstrip to be stored; and
   (c) a second ply substantially co-extensive with said first ply and secured to said extending portions to form said strip-receiving channel therebetween;
   (d) each of said plies having
      (1) a slot medially located with respect to said channel and extending longitudinally thereof in opposed relation to the corresponding slot in the other ply to facilitate the engagement and longitudinal positioning of a filmstrip when in said channel; and
      (2) a viewing aperture remote from said one end of said channel area and medially located with respect to said channel and in opposed relation to the corresponding aperture in the other ply to facilitate the viewing of images on a filmstrip when in said channel.

5. A two-ply device in accordance with claim 4 and comprising a throat aligned with said channel and defined by one of the slits of each series, the portion of said channel area therebetween, and the adjacent surface of said second ply, a section of said portion having been removed to expose the underlying adjacent surface of said second ply, whereby said throat forms a guide for inserting the filmstrip into said channel.

References Cited in the file of this patent

UNITED STATES PATENTS

| | | |
|---|---|---|
| 1,678,621 | Holmes | July 24, 1928 |
| 1,934,497 | Grove | Nov. 7, 1933 |
| 2,687,590 | Johnson | Aug. 31, 1954 |
| 2,933,030 | Bornemann | Apr. 19, 1960 |
| 2,982,176 | Kay | May 2, 1961 |

FOREIGN PATENTS

| | | |
|---|---|---|
| 128,498 | Switzerland | Nov. 1, 1928 |
| 136,065 | Great Britain | Dec. 11, 1919 |